April 7, 1964

F. J. LUKETA 3,127,693

EXPANDER RING FOR TRAWL NETS

Filed Feb. 18, 1963

INVENTOR.
FRANK J. LUKETA
BY Reynolds and
Christenson
ATTORNEYS

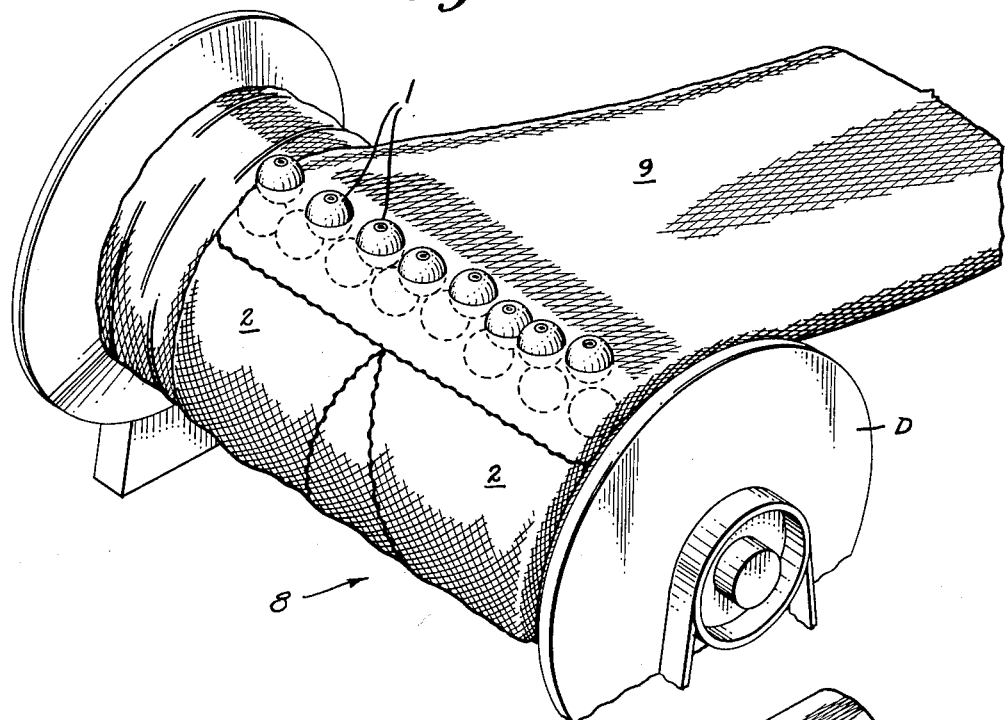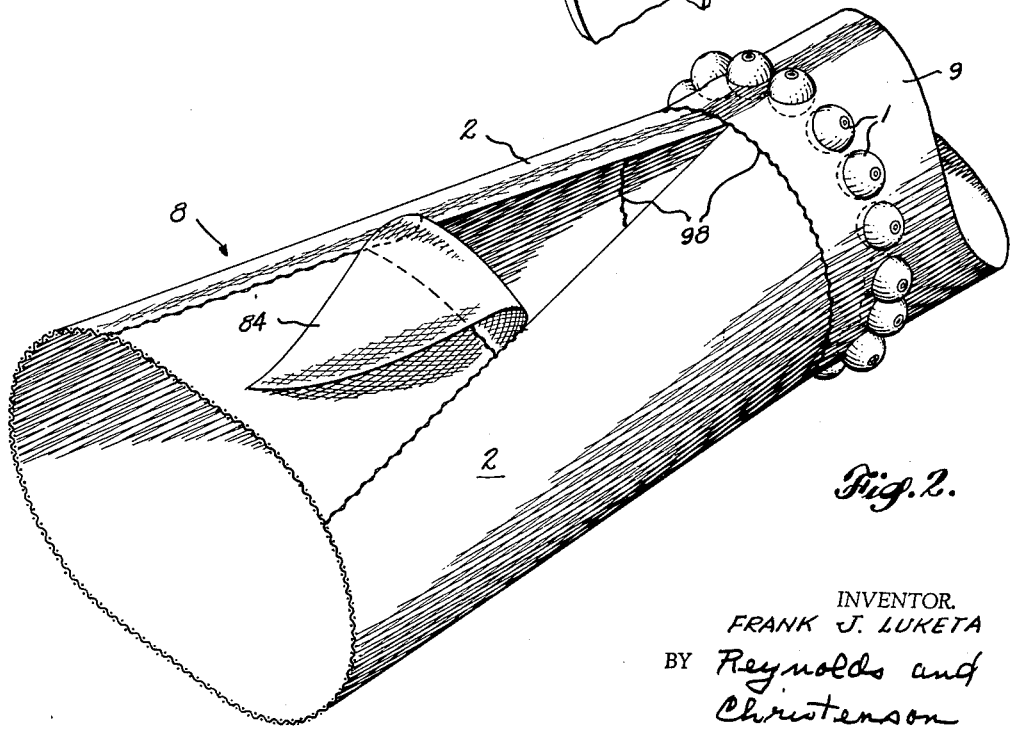

April 7, 1964   F. J. LUKETA   3,127,693
EXPANDER RING FOR TRAWL NETS
Filed Feb. 18, 1963   5 Sheets-Sheet 3
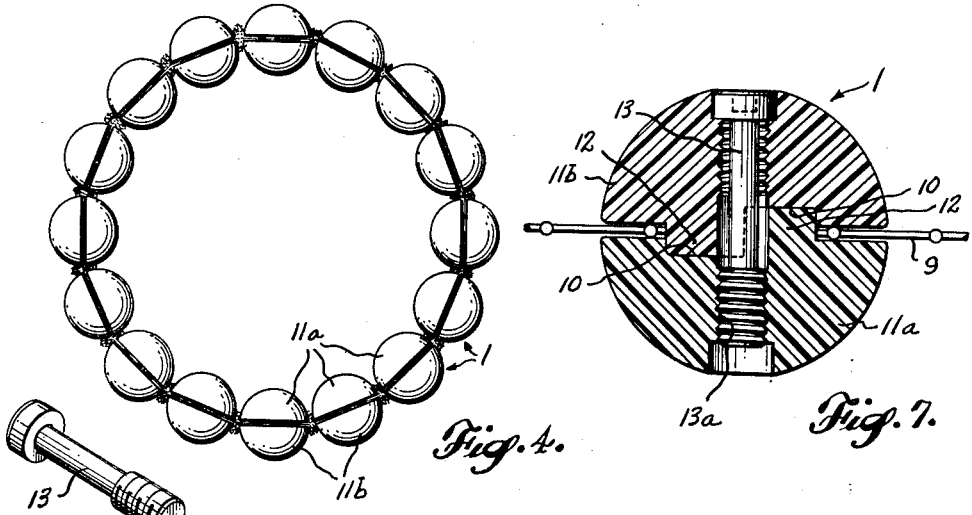
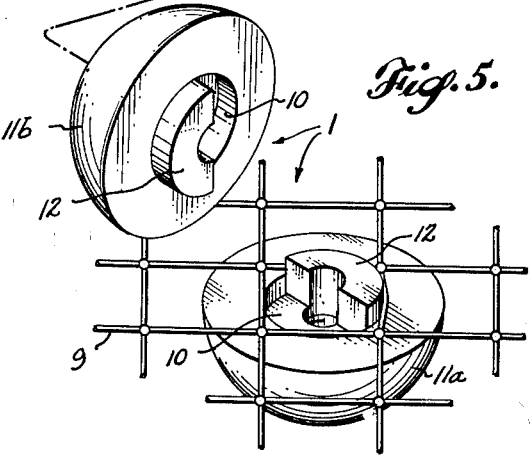
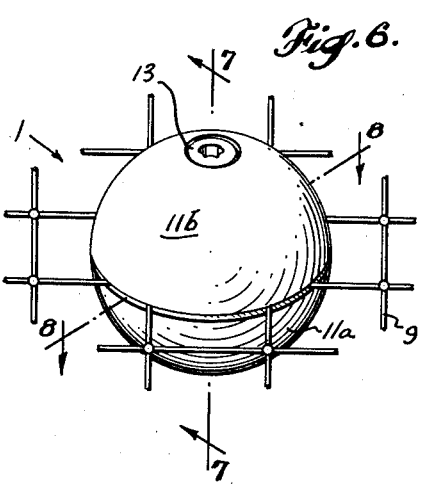
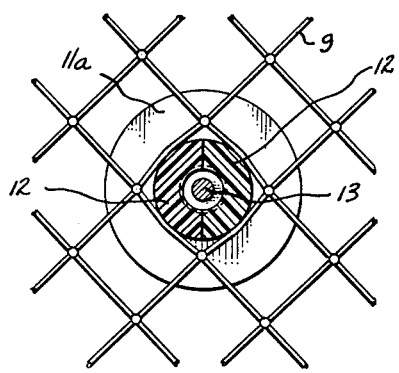
INVENTOR.
FRANK J. LUKETA
BY Reynolds and
Christenson
ATTORNEYS April 7, 1964 F. J. LUKETA 3,127,693
EXPANDER RING FOR TRAWL NETS
Filed Feb. 18, 1963 5 Sheets-Sheet 5
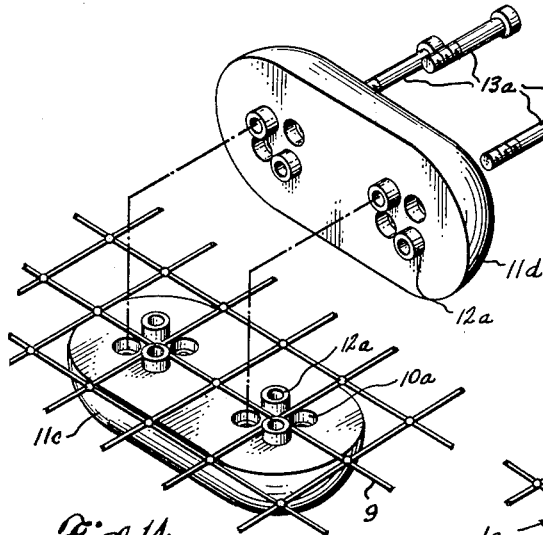
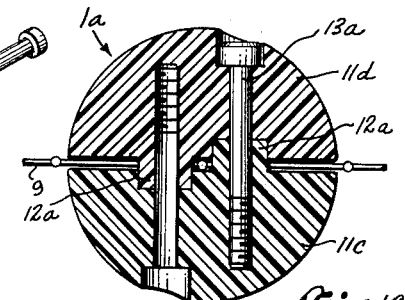
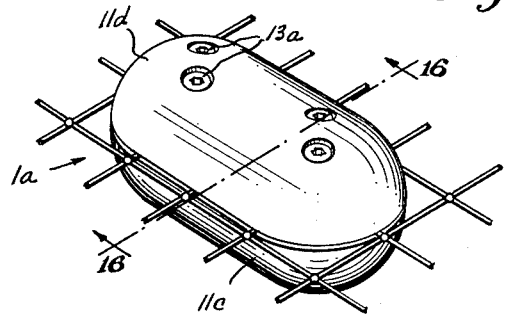
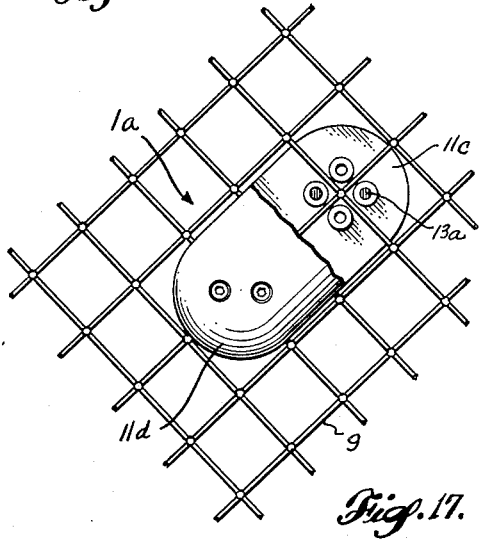
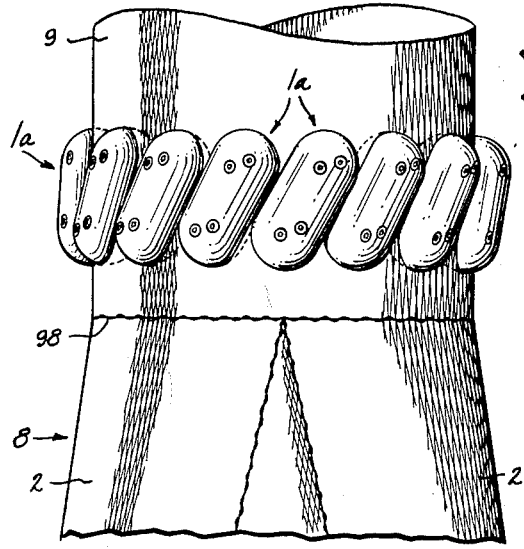
INVENTOR.
FRANK J. LUKETA
BY Reynolds and
Christenson
ATTORNEY United States Patent Office 3,127,693
Patented Apr. 7, 1964

3,127,693
EXPANDER RING FOR TRAWL NETS
Frank J. Luketa, 5567 Greenwood Ave., Seattle, Wash.
Filed Feb. 18, 1963, Ser. No. 259,154
9 Claims. (Cl. 43—9)

In my application for patent on an Expander Ring and Trap for Trawl Nets, Serial No. 85,662, filed January 30, 1961, there is disclosed a rigid expander ring encircling the entrance to the codend of a trawl net, about the forward face of which ring mesh suspenders are secured, whereby to transmit the drag from the trawler through the suspenders to the codend attached to its after face, without unduly constricting the codend and its entrance, as a result of the constriction attendant upon longitudinal stressing of the mesh in normal use. Such a rigid expander ring may well be used when the trawler is of large enough size that the entire codend can be hauled onto the deck without reeling any portion of the codend about the winch drum by which the net is hauled (usually by the known drum trawling method). If the rigid expander ring had to wind onto the drum, being of such large size it would interfere with the reeling in of the net.

Few present-day trawlers in use in the United States are of such large size that the entire codend can be hauled on deck without the rigid expander ring winding onto the drum. The advantages of such an expander ring are lost in such trawlers, therefore, unless the expander ring can be so made that it is sufficiently flexible or collapsible that it can wind onto the drum without interference, yet that it must be sufficiently rigid in use that it will hold open the entrance to the codend despite the constricting effect of the tension upon the mesh suspenders. It is to the solution of this problem that the present invention is directed.

More particularly, it is an object of the present invention to devise an expander ring, capable of securement to the mesh in the vicinity of the junction of the codend and the funnel leading thereto, of which funnel the mesh suspenders are a part, which expander ring will be adequately rigid in use to maintain the entrance to the codend open, yet adequately flexible to collapse onto the drum during hauling in. Thereby the expander ring can be used with a net employed by smaller trawlers such as are now in common use in the United States.

The expander ring of the present invention is flexible because it is made up of beads, separate or connected, at least by the mesh whereupon they are supported, and sufficiently closely spaced circumferentially about the entrance to the codend, that when the mesh constricts circumferentially under longitudinal stress in normal use they come into mutually supporting relation, so that no one bead can sag inwardly, especially with the water forces during dragging urging them all outwardly. At the same time the meshes whereon they are mounted are sufficiently flexible that when the funnel and codend are wound upon a winch drum, in the drum trawling method, they are subjected to forces which will flatten them down, and the expander ring in effect is collapsed.

It is a further object of this invention to make up such a collapsible expander ring of units which can be molded all in a single mold, and which can be fitted together in proper relation to the mesh squares and retained in such relation and in proper relation to other such beads, in a simple manner.

FIGURE 1 is an isometric view, partly broken away, of a bottom trawl net such as the present invention can be applied to.

FIGURE 2 is an isometric view of the junction of the funnel with the codend of such a net, in use, with the expander ring of this invention holding the codend entrance open, and FIGURE 3 is an isometric view showing the same net being wound upon a drum.

FIGURE 4 is a cross-sectional view transversely of a net equipped with such an expander ring, in use.

FIGURE 5 is an isometric view of a single bead of which the expander ring is composed, in the process of installation, and FIGURE 6 is a like view of the bead installed.

FIGURE 7 is a sectional view at the line 7—7 of FIGURE 6, and FIGURE 8 a sectional view at the line 8—8 of FIGURE 6.

FIGURE 13 is a view similar to FIGURES 11 and 12, showing a further form of the expander ring, in which the beads are elongated.

FIGURE 14 is an isometric view similar to FIGURE 5, FIGURE 15 a view similar to FIGURE 6, FIGURE 16 a view similar to FIGURE 7, and FIGURE 17 a view similar to FIGURE 8, all showing the elongated form of the bead.

Figure 1:
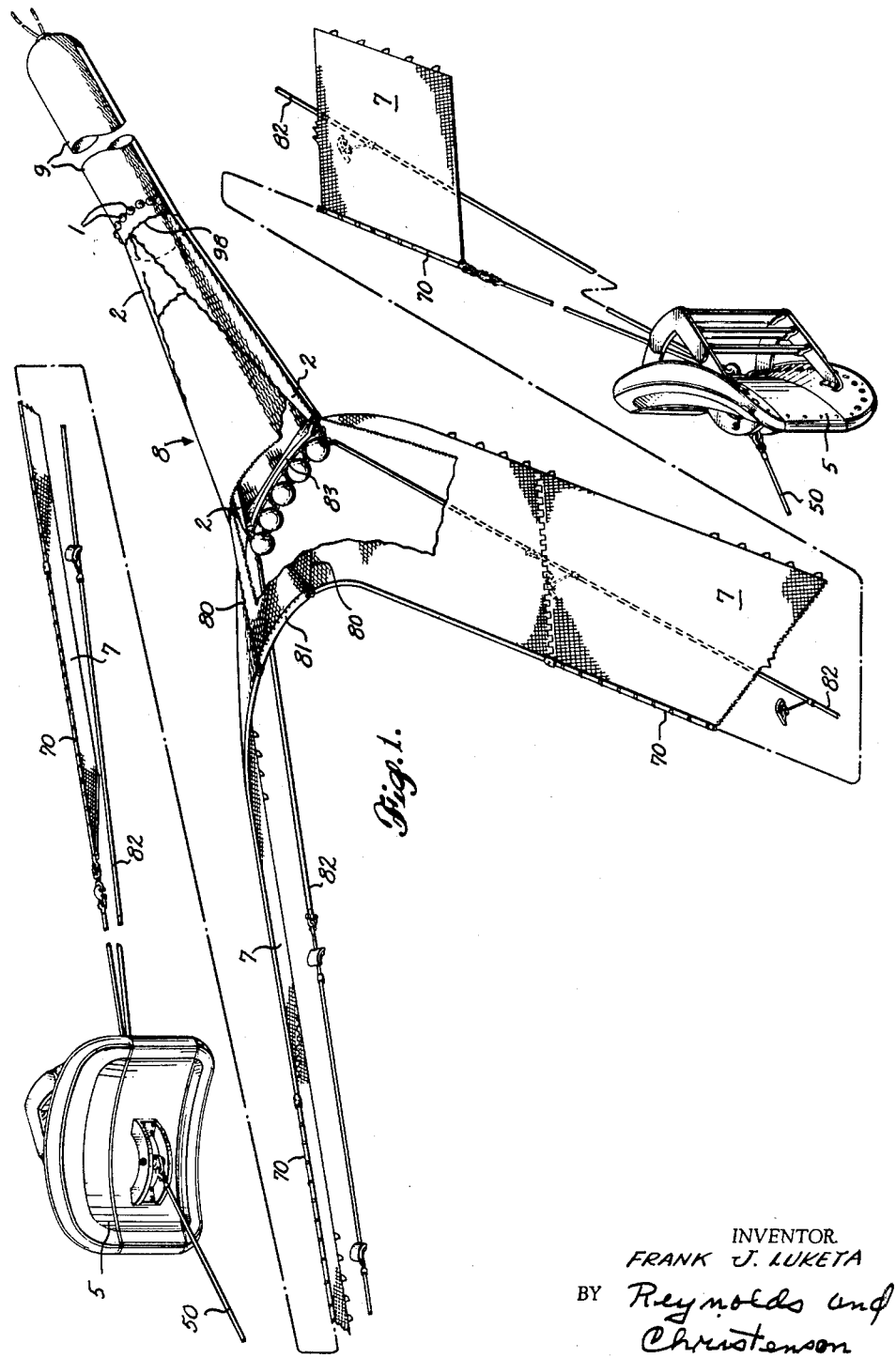

Referring first to the general view, FIGURE 1, the net is illustrated as a bottom trawl net, although the invention is applicable also to a midwater trawl net. As shown it comprises a codend 9 of mesh, a funnel 8 of mesh converging aft and leading to the open entrance to the codend, and curtains 7 diverging forwardly from the upper bosom 81 and joined at 80 to the forward side edges of the funnel. Sweep lines 82 diverge forwardly from the opposite ends of the lower bosom 83 to doors 5 at the opposite sides of and ahead of the net, and curtain lines 70, whereon the curtains hang, diverge forwardly from the opposite ends of the upper bosom to the doors. Towing warps 50 from the trawler (not shown) tow the doors which in turn drag the net forwardly. Suspenders 2 of heavy mesh are located at each side of the funnel. Their after ends are distributed part way about the entrance to the funnel, at the line 98, and their forward ends are gathered to a point. The sweep lines 82 are anchored at such points to the respective suspenders 2, and transmit the drag to the codend through the suspenders. These suspenders tend to constrict circumferentially under longitudinal stress, and this tendency is transmitted to the codend at its entrance.

In essence the present invention employs a mesh element which encircles and defines the entrance to the codend, which mesh is so oriented that it is elongatable under stress, and thereby is constricted circumferentially. Such mesh element may be the mesh of the codend or of the funnel. In the absence of an expander ring or its equivalent, the constriction might progress until the entrance is effectively closed, and fish gathered in the funnel could not enter and would eventually escape. In practice of this invention a plurality of spaced beads are secured circumferentially of the mesh at sufficiently close spacings circumferentially that when the mesh is elongated under the normal stresses of use the beads come at least approximately into contact, and by that contact limit the circumferential constriction and hold the entrance open sufficiently that fish may always enter. Nevertheless, when the circle of beads is subjected to diametrally rather than circumferentially applied force, it will collapse. Such a diametrally applied force results from the flattening effect of the mesh as it is wound upon a drum, and as subsequent windings press the mesh towards the drum. All this will be explained more fully hereinafter.

The expander ring is shown as supported by the mesh, whether of the codend or of the funnel is immaterial, but somewhere in the vicinity of the line 98 where the funnel joins the codend. It consists of a circle of beads 1, each separate such as shown herein, and each supported upon the mesh, while that mesh is relaxed, at such close intervals circumferentially that when lateral or circumferential constriction of the mesh draws them closely together, they come approximately into contact, and this limits the constriction and renders them mutually self-supporting in the round form, as seen in FIGURE 4. The exact form of the ring or shape of the individual beads 1, and the manner in which, or upon the mesh of what net element they are mounted, are not material in the broad sense, yet the forms shown are convenient, and enable each bead to be mounted or dismounted readily, and to be made inexpensively, all from one mold.

Thus, as best shown in FIGURE 5, the beads 1 are preferably made of two identical halves designated 11a and 11b wherever it is necessary to distinguish them. One, the half 11a, might be termed the interior half and the other the exterior half. They divide along a diametral plane, and each has an outstanding half boss 12 fitting within a half recess 10 of the other. The complete boss is of a size to fill a mesh square of the codend, and the two halves of a bead, at opposite sides of the mesh, are held together by a bolt 13, passing through one half and threaded at 13a into the other half. This is all made clear in FIGURES 4 to 8 inclusive.

The material of which the beads are made is shown as rubber, but this is not material. If of rubber they will resist wear, and be readily molded. They might, for example, be made of molded nylon, polypropylene, or the like. Alternatively, those at the top of the codend might be of buoyant material, and those at the bottom of non-buoyant or dense material.

Figure 11:
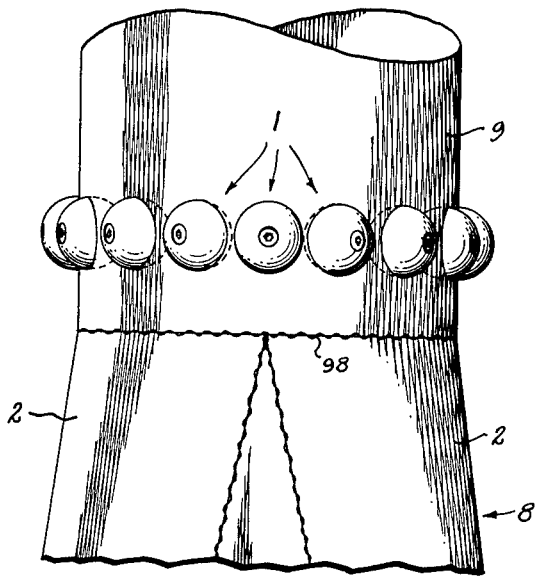
FIGURE 11 is a plan view of the ring of beads, and adjacent portions of the net.
Figure 9:
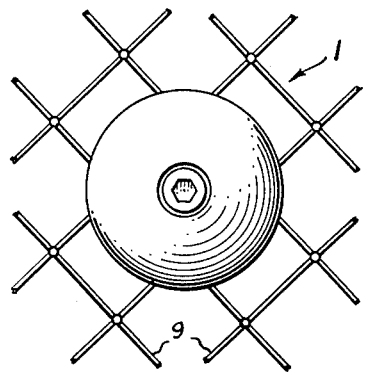
FIGURE 9 is a plan view of an installed bead, with the mesh relaxed.
Figure 10:
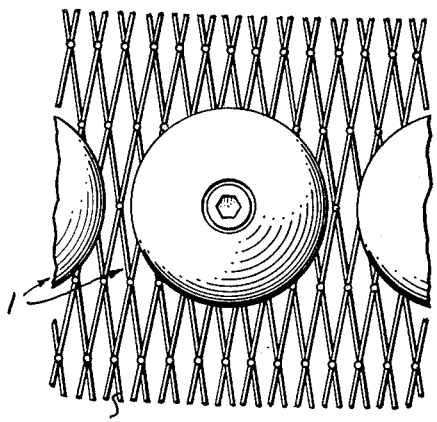
FIGURE 10 is a like view with the mesh laterally constricted, as it would be under longitudinal stress, showing how the beads approach to afford mutual support.

Referring to FIGURES 2 and 3, the net is shown in FIGURE 2 as it would be while being dragged ahead through the water. Water entering the open end of the funnel, and moving towards the codend, will serve to distend the latter's entrance, at 98, circularly, yet the longitudinal pull upon the meshes will tend to constrict them circumferentially, as FIGURE 2 shows. (The flap shown at 84 in FIGURE 2 would be joined along its edges to the remainder of the funnel 8, but is thrown back as it would be when the beads are being installed or replaced.) This constriction moved the adjacent beads 1, which were installed with the mesh relaxed, as in FIGURE 9, closely together, as they are in FIGURE 10, so much so that in effect they are mutually self-supporting, as in FIGURES 4 and 11, and no one of them will sag inwardly. Now if the net is hauled in upon a drum D, as in FIGURE 3, the mutual tendency to maintain the circular form is overcome by the very great tension in the mesh, and by the flattening effect thereon as the ring passes onto the drum, and as further wraps of mesh press down upon the circle, and the ring collapses, as it has already in FIGURE 3. It is no longer an obstruction to winding in, and affords no excessive bulk for the remainder of the codend to be wound upon the drum. When the net is reset, the mesh relaxes as it winds off the drum D, and the round of the entrance at 98 and of the expander ring is automatically restored.

Figure 12:
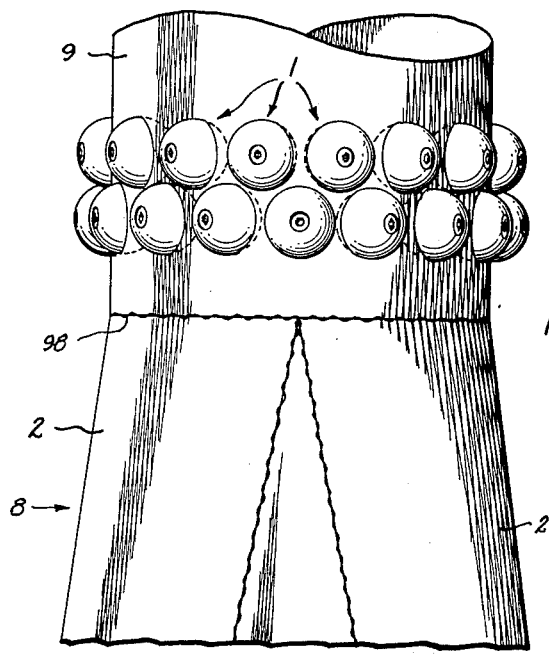
FIGURE 12 is a view similar to FIGURE 11, but showing a different form of the expander ring.

Instead of forming a single expander ring the beads may be arranged to form two such rings, close together axially and somewhat offset or staggered circumferentially, as in FIGURE 12, or in effect two such beads may be joined into one, as in FIGURES 13 to 17, disposed each diagonally relative to the axis of the entrance. In this form, as in the form of FIGURES 4 to 7, the two halves 11c and 11d of each bead 1a can be formed from the same mold, for economy. Each has bosses 12a received within recesses 10a, and the two halves are held together by bolts 13a. The four bosses at each end of each bead straddle the bars of the mesh which cross at a knot (see FIGURES 14 and 17), and this holds the beads accurately in position. Their manner of functioning is the same as has already been described.

From the foregoing discussion of several typical embodiments of the present invention, other modifications and adaptations thereof will readily occur to those skilled in the art to which the invention is addressed, within the scope of the following claims.

I claim as my invention:

1. In a trawl net having a codend, a mesh element defining the entrance to the codend, and elongatable under stress, to be thereby constricted circumferentially, and a plurality of beads each secured to the meshes of said element and distributed about the entrance thereof at sufficiently close spacings to come approximately into mutually supporting engagement when the mesh is elongated under normal stress during use.

2. The combination of claim 1, wherein the beads are formed in halves, and applied to the mesh with one half interiorly and the other half exteriorly of the entrance, said halves having locating elements penetrating the mesh and fixing the bead in position upon the mesh.

3. The combination of claim 2, including a boss upstanding from at least one half, and the other half having a socket receiving said boss, the boss constituting a locating element.

4. The combination of claim 2, wherein the halves are identical, each having a half-boss projecting towards the other half, and each having a socket to receive the half-boss of the other half, said half-bosses constituting locating elements.

5. The combination of claim 1, wherein the beads are arranged in two circles closely adjacent, the beads in one circle being offset circumferentially intermediate the beads in the other circle.

6. The combination of claim 1, wherein the beads are elongated, and each is disposed angularly relatively to the axis of the entrance.

7. In a trawl net, in combination with a codend of elongatable mesh open at its forward entrance and a funnel of elongatable mesh joined to the codend about such entrance and extending forwardly therefrom, means for maintaining the entrance open during use comprising a series of beads each secured to the mesh and distributed around said entrance at sufficiently close spacings to come approximately into engagement when the mesh is elongated.

8. In a trawl net, a mesh element defining the entrance to a codend, and oriented to be elongatable under stress and to be thereby constricted circumferentially, a plurality of beads each formed of an interior and an exterior half, separable at a diametral plane, a boss outstanding from each such half and passing through a mesh to locate the bead, the opposite half having a socket to receive said boss, and means to join the two halves, said beads being distributed circumferentially about the entrance in sufficiently close spacing that when the mesh element is constricted circumferentially they will contact one another, and thereby limit such constriction.

9. A trawl net combination as in claim 8, wherein the beads are elongated to span at least two mesh squares, and are disposed along a bar of the mesh, each half at the point at each end where it includes a point of the mesh having the boss and sockets, to straddle two crossing bars at each such point, and the several beads being disposed diagonally relative to the axis of the entrance.

References Cited in the file of this patent

UNITED STATES PATENTS

| 988,897 | Raymond | Apr. 4, 1911 |
|---|---|---|
| 3,018,581 | Luketa | Jan. 30, 1962 |

FOREIGN PATENTS

| 294,363 | Germany | Oct. 4, 1916 |